(12) United States Patent
Jang et al.

(10) Patent No.: US 11,595,660 B2
(45) Date of Patent: Feb. 28, 2023

(54) METHOD AND APPARATUS FOR DECODING IMAGE ON BASIS OF PREDICTION BASED ON MMVD IN IMAGE CODING SYSTEM

(71) Applicant: LG Electronics Inc., Seoul (KR)

(72) Inventors: Hyeongmoon Jang, Seoul (KR); Junghak Nam, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/366,722

(22) Filed: Jul. 2, 2021

(65) Prior Publication Data

US 2021/0337209 A1  Oct. 28, 2021

Related U.S. Application Data

(63) Continuation of application No. PCT/KR2020/000113, filed on Jan. 3, 2020.
(Continued)

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/176* (2014.11); *H04N 19/46* (2014.11)

(58) Field of Classification Search
CPC .. H04N 19/139; H04N 19/105; H04N 19/176; H04N 19/46
See application file for complete search history.

(56) References Cited

U.S. PATENT DOCUMENTS 10,944,983 B2*  3/2021  Chen ................... H04N 19/70
2020/0154101 A1*  5/2020  Li ....................... H04N 19/46
(Continued)

FOREIGN PATENT DOCUMENTS

KR  10-2018-0028513  3/2018

OTHER PUBLICATIONS

Jang et al., "Non-CE8: MMVD harmonization with CPR," JVET-M0341, Joint Video Experts Team (JVET) of ITU-T SG 16 WP 3 and ISO/IEC JTC 1/SC 29/WG 11, 13th Meeting, Marrakech, MA, dated Jan. 9-18, 2019, 5 pages.
(Continued)

*Primary Examiner* — Francis Geroleo
(74) *Attorney, Agent, or Firm* — Fish & Richardson P.C.

(57) ABSTRACT

A decoding apparatus performs an image decoding method by receiving a bit stream including prediction information of a current block; deriving motion information of the current block on the basis of a merge candidate indicated by a candidate flag of the current block in a merge candidate list; deriving a MVD of the current block on the basis of MVD information of the current block and whether or not integer sample precision or fractional sample precision is used in the motion information; deriving modified motion information of the current block on the basis of the motion information and the MVD; and performing prediction of the current block on the basis of the modified motion information.

9 Claims, 10 Drawing Sheets

Related U.S. Application Data

(60) Provisional application No. 62/788,145, filed on Jan. 4, 2019.

(51) Int. Cl.
*H04N 19/176* (2014.01)
*H04N 19/46* (2014.01)

(56) References Cited

U.S. PATENT DOCUMENTS

| | | | |
|---|---|---|---|
| 2020/0195948 A1* | 6/2020 | Li | H04N 19/105 |
| 2021/0152845 A1* | 5/2021 | Liu | H04N 19/52 |
| 2021/0203945 A1* | 7/2021 | Liu | H04N 19/137 |
| 2021/0306659 A1* | 9/2021 | Lai | H04N 19/52 |

OTHER PUBLICATIONS

Park et al., "CE4-related : Candidates optimization on MMVD," JVET-M0307, Joint Video Experts Team (JVET) of ITU-T SG 16 WP 3 and ISO/IEC JTC 1/SC 29/WG 11, 13th Meeting, Marrakech, MA, dated Jan. 9-18, 2019, 7 pages.

Xu et al., "CE4-related: Simplification of candidate list derivation for MMVD mode," JVET-M0330 v2, Joint Video Experts Team (JVET) of ITU-T SG 16 WP 3 and ISO/IEC JTC 1/SC 29/WG 11, 13th Meeting, Marrakech, MA, Jan. 9-18, 2019, 9 pages.

Zhao et al., "Non-CE4: Size constraint on MMVD," JVET-M0437, Joint Video Experts Team (JVET) of ITU-T SG 16 WP 3 and ISO/IEC JTC 1/SC 29/WG 11, 13th Meeting, Marrakech, MA, dated Jan. 9-18, 2019, 4 pages.

\* cited by examiner

METHOD AND APPARATUS FOR DECODING IMAGE ON BASIS OF PREDICTION BASED ON MMVD IN IMAGE CODING SYSTEM

CROSS-REFERENCE TO RELATED APPLICATIONS

Pursuant to 35 U.S.C. § 119(e), this application is a continuation of International Application PCT/KR2020/000113, with an international filing date of Jan. 3, 2020, which claims the benefit of U.S. Provisional Patent Application No. 62/788,145, filed on Jan. 4, 2019, the contents of which are hereby incorporated by reference herein in their entirety.

BACKGROUND OF DISCLOSURE

Field of the Disclosure

This document relates to an image coding technique, and more particularly, to an image decoding method and apparatus based on inter prediction using a merge motion vector difference (MMVD) in an image coding system.

Related Art

Nowadays, demand for high-resolution, high-quality images such as high definition (HD) images and ultra high definition (UHD) images is increasing in various fields. As image data become high resolution and high quality, the amount of information or bits to be transmitted increases relative to the conventional image data. Therefore, when such image data are transmitted using a medium such as a conventional wired/wireless broadband line, or stored using an existing storage medium, the transmission cost and the storage cost thereof are increased.

Accordingly, there is a need for a highly efficient image compression technique for effectively transmitting, storing, and reproducing information of high resolution, high-quality images.

SUMMARY

The purpose of this document is to provide a method and apparatus for improving image coding efficiency.

Another purpose of this document is to provide a method and apparatus for performing prediction by deriving MVD based on MVD information and a predefined table.

Still another purpose of this document is to provide a method and apparatus for performing prediction in which a merge motion vector difference (MMVD) is derived taking CPR into consideration.

According to an embodiment of this document, an image decoding method performed by a decoding apparatus is provided. The method includes receiving a bitstream including prediction information of a current block, constructing a merge candidate list for the current block, deriving motion information of the current block based on a merge candidate indicated by a candidate flag of the current block in the merge candidate list, deriving an MVD of the current block based on whether integer sample precision or fractional sample precision is used for the motion information, and on MVD information for the current block, deriving modified motion information of the current block based on the motion information and the MVD, and performing prediction on the current block based on the modified motion information, wherein the prediction information includes the candidate flag and the MVD information.

According to another embodiment of this document, a decoding apparatus for performing image decoding is provided. The decoding apparatus includes an entropy decoder receiving a bitstream including prediction information of a current block, and a predictor constructing a merge candidate list for the current block, deriving motion information of the current block based on a merge candidate indicated by a candidate flag of the current block in the merge candidate list, deriving an MVD of the current block based on whether integer sample precision or fractional sample precision is used for the motion information, and on MVD information for the current block, deriving modified motion information of the current block based on the motion information and the MVD, and performing prediction on the current block based on the modified motion information, wherein the prediction information includes the candidate flag and the MVD information.

According to still another embodiment of this document, a video encoding method which is performed by an encoding apparatus is provided. The method includes constructing a merge candidate list for a current block, deriving motion information of the current block based on a merge candidate in the merge candidate list, deriving an MVD of the current block based on whether integer sample precision or fractional sample precision is used for the motion information, deriving modified motion information of the current block based on the motion information and the MVD, performing prediction on the current block based on the modified motion information, and encoding prediction information including a candidate flag and MVD information of the current block, wherein the candidate flag indicates the merge candidate.

According to still another embodiment of this document, a video encoding apparatus is provided. The encoding apparatus includes a predictor constructing a merge candidate list for a current block, deriving motion information of the current block based on a merge candidate in the merge candidate list, deriving an MVD of the current block based on whether integer sample precision or fractional sample precision is used for the motion information, deriving modified motion information of the current block based on the motion information and the MVD, and performing prediction on the current block based on the modified motion information, and an entropy encoder encoding prediction information including a candidate flag and MVD information of the current block, wherein the candidate flag indicates the merge candidate.

According to this document, it is possible to improve overall image/video compression efficiency.

According to this document, an MVD can be derived based on the signaled MMVD index information and a pre-defined table, and prediction can be performed by deriving motion information of a current block based on the derived MVD and a merge candidate of the current block, through which the amount of bits for transmitting the MVD can be reduced, thus improving overall coding efficiency.

According to this document, an MMVD using integer sample precision or fractional sample precision can be derived considering a case where current picture referencing (CPR) is applied while using an existing MMVD distance table, and through this, the MMVD and the CPR can be efficiently used for image coding, thus improving overall coding efficiency.

DESCRIPTION OF EMBODIMENTS

Figure 1:
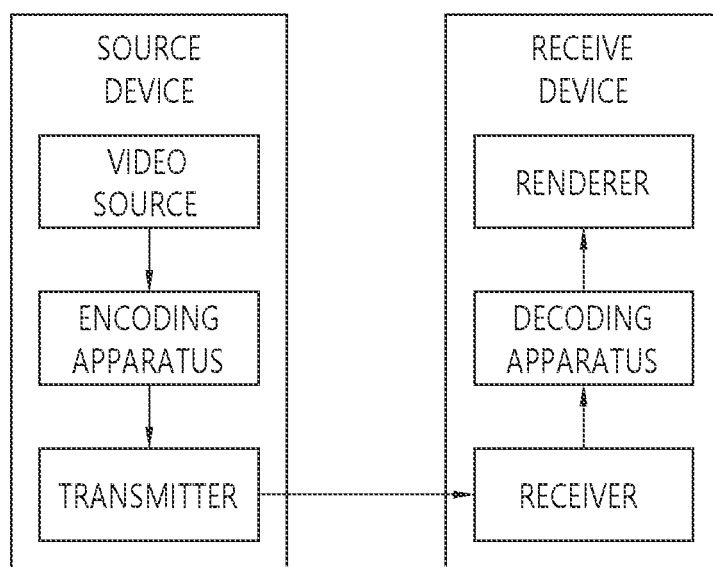
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
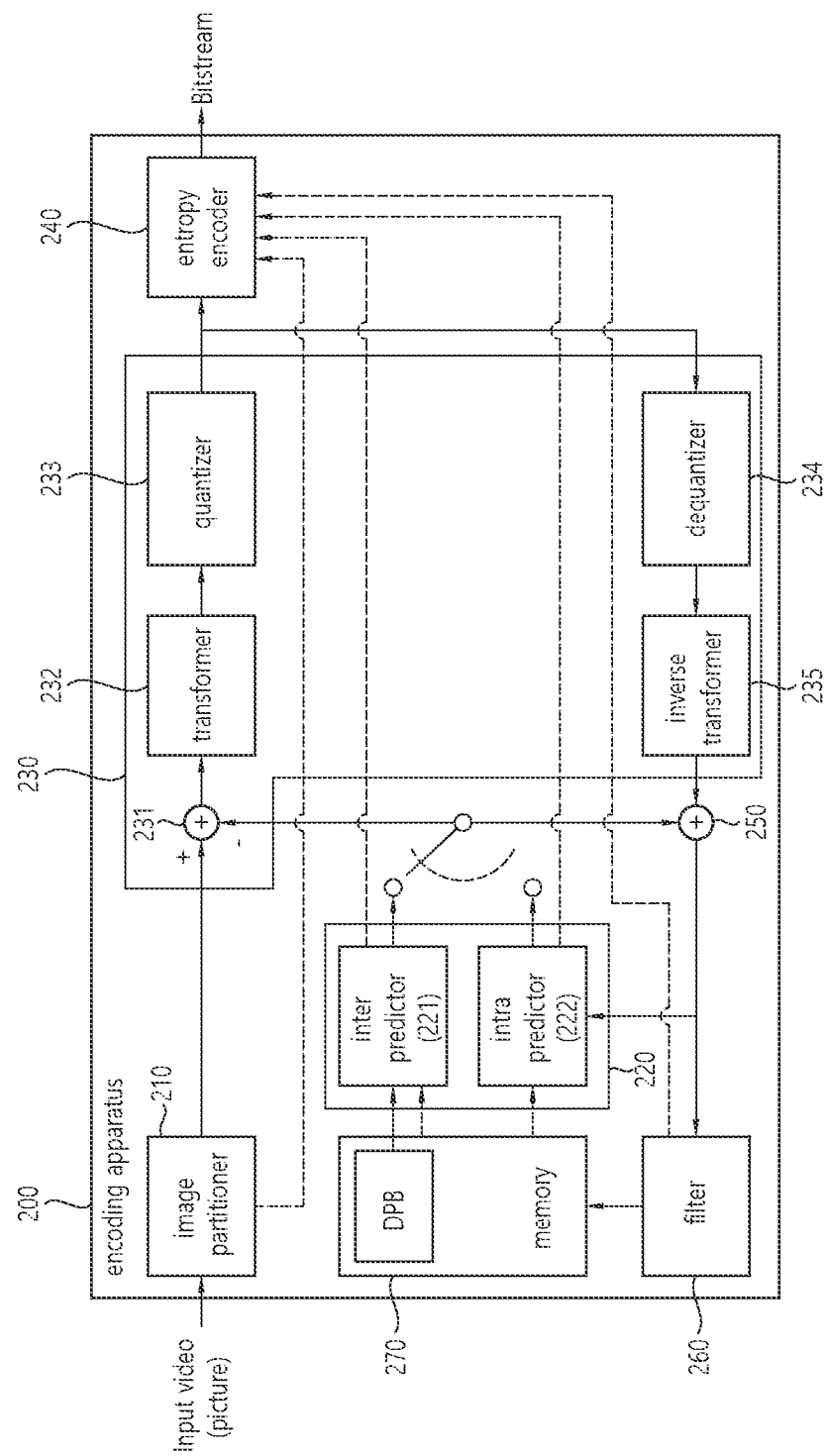
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
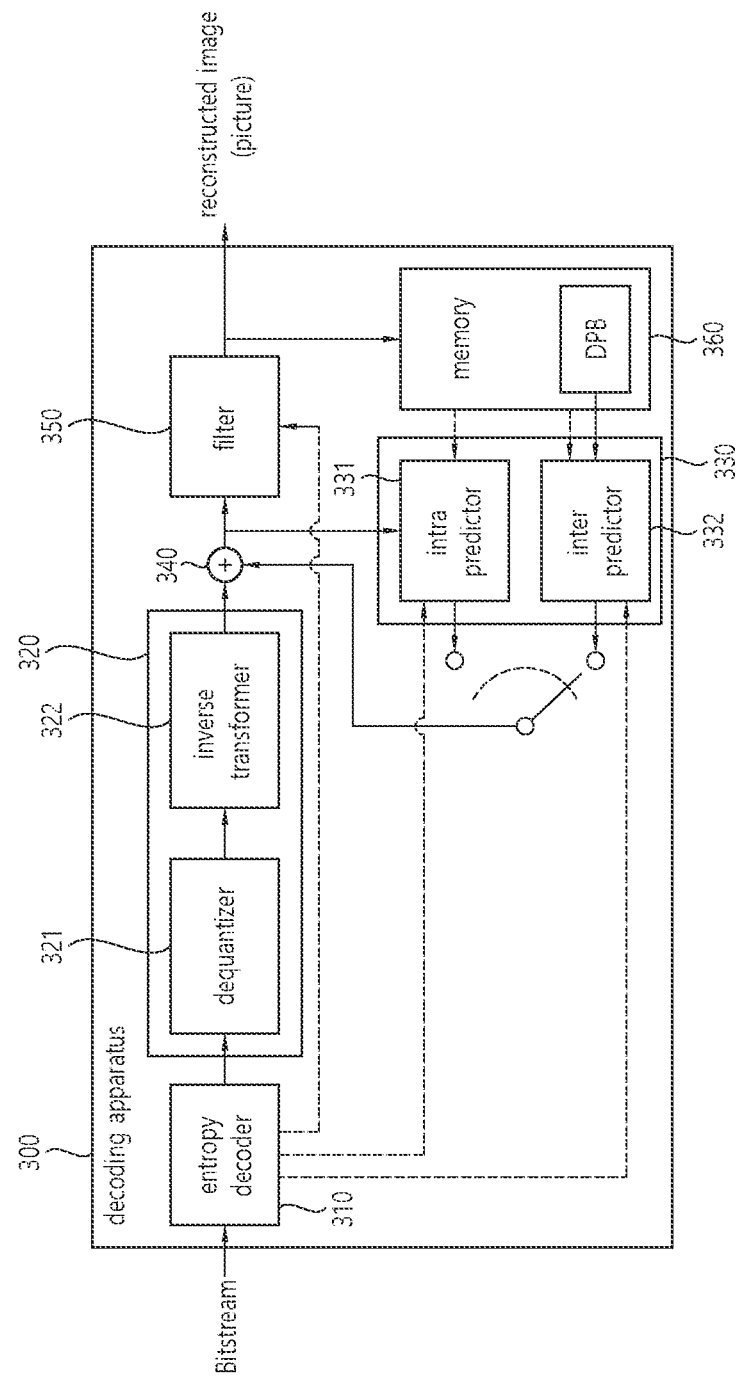
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, when the inter prediction is performed, as described above, the merge mode or the MVP mode may be applied, so that the motion information for the current block can be derived. For example, when the merge mode is applied to the current block, motion information of the current block is not directly transmitted, but motion information of the current block may be derived using motion information of a neighboring block of the current block. Accordingly, the motion information of the current block may be indicated by transmitting flag information related to whether or not a merge mode is applied and a merge index related to a neighboring block used for deriving the motion information of the current block. Meanwhile, the merge mode may be referred to as a regular merge mode. For example, the flag information may be a regular merge flag, and the merge mode may be applied when the value of the regular merge flag is 1. A syntax element of the regular merge flag may be regular_merge_flag.

The encoding apparatus/decoding apparatus may construct a merge candidate list used to derive motion information of the current block to perform the merge mode. For example, up to five merge candidates in the merge candidate list may be used, but the embodiment(s) of this document is/are not limited to this. In addition, information related to the maximum number of merge candidates may be transmitted in a slice header or a tile group header, and the embodiment(s) of this document is/are not limited to this. The encoding apparatus/decoding apparatus may derive a merge candidate based on a neighboring block of the current block, and may construct a merge candidate list based on the merge candidate. The encoding apparatus may select, as the merge candidate of the current block, a merge candidate having the smallest cost from among the merge candidates in the merge candidate list. The cost may be calculated with a sum of absolute difference (SAD).

This document provides various embodiments of merge candidates constituting the merge candidate list.

The merge candidate list may include, for example, five merge candidates. For example, the merge candidate list may include four spatial merge candidates and one temporal merge candidate.

Figure 4:
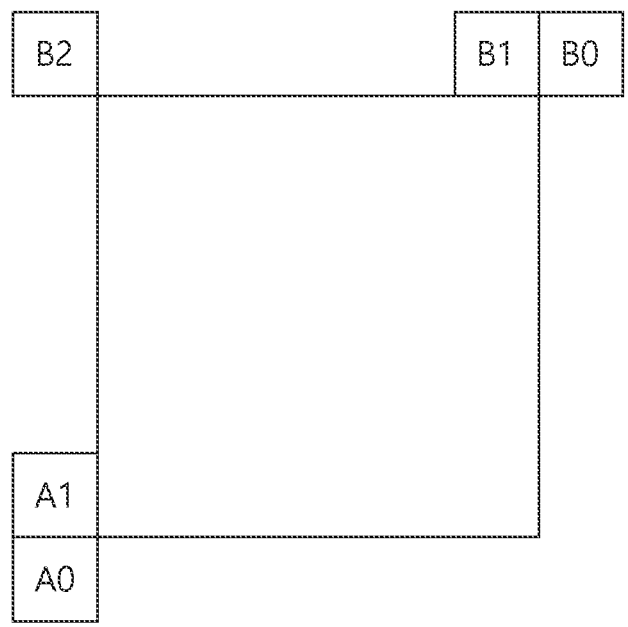
FIG. 4 exemplarily shows neighboring blocks of a current block used for spatial merge candidate derivation.

FIG. 4 exemplarily shows neighboring blocks of a current block used for spatial merge candidate derivation.

Referring to FIG. 4, a spatial merge candidate may be derived based on a left neighboring block, a bottom-left corner neighboring block, a top-right corner neighboring block, and a top-left corner neighboring block of the current block.

The merge candidate list for the current block may, for example, be constructed based on the following processes.

Figure 5:
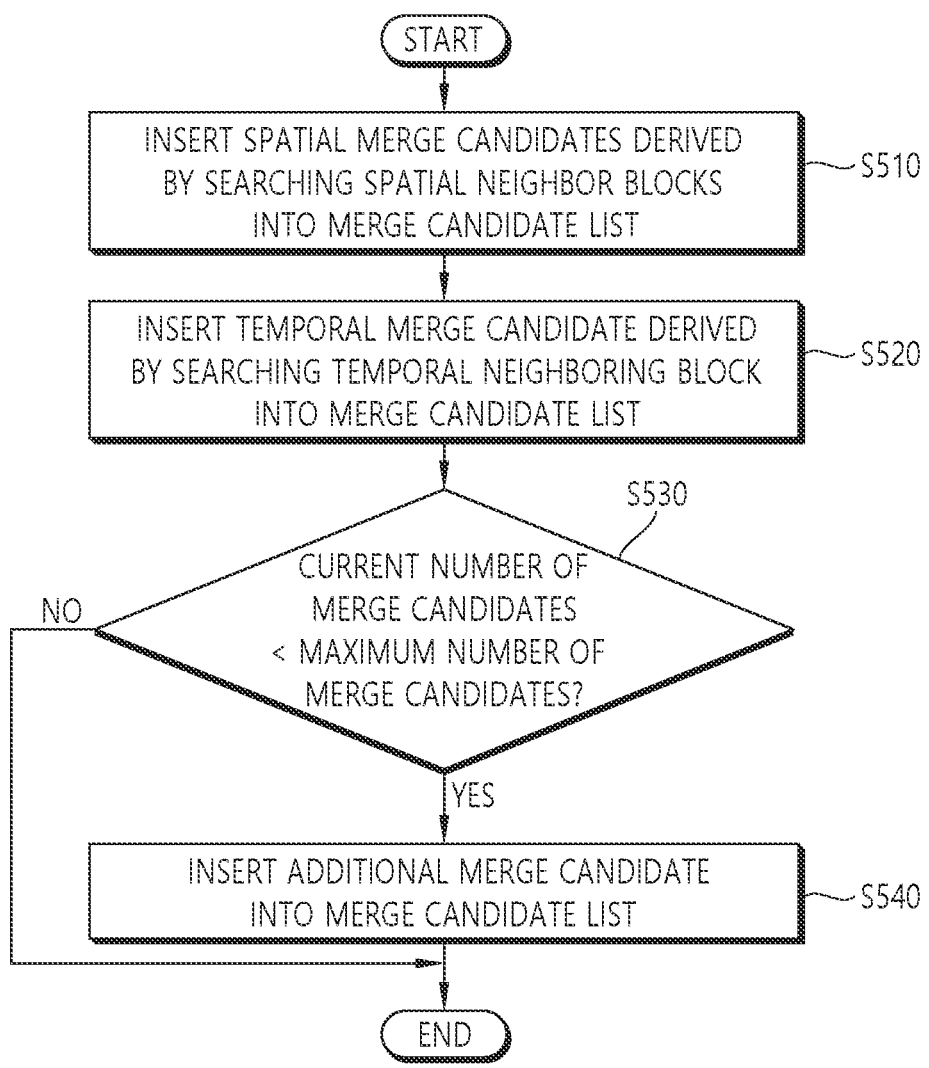
FIG. 5 shows an example of constructing a merge candidate list of the current block.

FIG. 5 shows an example of constructing a merge candidate list of the current block.

Referring to FIG. 5, the encoding apparatus/decoding apparatus inserts spatial merge candidates derived by searching for spatial neighboring blocks of the current block into the merge candidate list (S510). For example, the spatial neighboring blocks may include a bottom-left corner neighboring block, a left neighboring block, a top-right corner neighboring block, a top neighboring block, a top-left corner neighboring block of the current block. If the size of the current block is W×H, and an x component of the top-left sample position of the current block is a and a y component thereof is b, then the bottom-left corner neighboring block may be a block including a sample at coordinates (a−1, b+H); the left neighboring block, a block including a sample at coordinates (a−1, b+H−1); the top-right corner neighboring block, a block including a sample at coordinates (a+W, b−1); the top neighboring block, a block including a sample at coordinates (a+W−1, b−1); and the top-left corner neighboring block, a block including a sample at coordinates (a−1, b−1). That is, the left neighboring block may be a left neighboring block among the left neighboring blocks of the current block, which is located lowermost, and the top neighboring block may be a top neighboring block among the top neighboring blocks of the current block, which is located leftmost.

However, this is merely an example, and besides the aforementioned spatial neighboring blocks, additional neighboring blocks, such as a right neighboring block, a bottom neighboring block, a bottom-right neighboring block and the like, may be further used as the spatial neighboring blocks. The encoding apparatus/decoding apparatus may search the spatial neighboring blocks based on priority to detect available blocks, and may derive motion information of the detected blocks as the spatial merge candidates. For example, the encoding apparatus/decoding apparatus searches the five neighboring blocks shown in FIG. 4 in the order of the left neighboring block, the top neighboring block, the top-right corner neighboring block, the bottom-left corner neighboring block, and the top-left corner neighboring block, and may sequentially index the available candidates, constructing a merge candidate list.

The encoding apparatus/decoding apparatus inserts a temporal merge candidate derived by searching the temporal neighboring block of the current block into the merge candidate list (S520). The temporal neighboring block may be located on a reference picture that is a different picture from a current picture where the current block is located. The reference picture where the temporal neighboring block is located may be referred to as a collocated picture or a col picture. The temporal neighboring blocks may be searched in the order of a bottom-right corner neighboring block and a bottom-right center block of a co-located block with respect to the current block on the collocated picture. Meanwhile, in the case of applying motion data compression, a specific motion information may be stored as a representative motion information at every certain storage unit in the collocated picture. In this case, it is unnecessary to store motion information for all blocks within the certain storage unit, through which motion data compression effect can be obtained. In this case, the certain storage unit may be, for example, predetermined as a 16×16 sample unit, an 8×8 sample unit or the like, or size information on the certain storage unit may be signaled from the encoding apparatus to the decoding apparatus. In a case where the motion data compression is applied, the motion information of the temporal neighboring block may be substituted by a representative motion information of the certain storage unit where the temporal neighboring block is located. That is, in this case, from a viewpoint of embodying, the temporal merge candidate may be derived based on motion information not of the block located at coordinates of the temporal neighboring block, but of a block covering the location arithmetically shifted left after being arithmetically shifted right by a certain value based on coordinates of the temporal neighboring block (top-left sample position). For example, in a case where the certain storage unit is a 2n×2n sample unit, if coordinates of the temporal neighboring block are (xTnb, yTnb), the motion information of the block located at ((xTnb>>n)<<n), (yTnb>>n)<<n)) that correspond to a modified location, may be used for the temporal merge candidate. Specifically, for example, in a case where the certain storage unit is a 16×16 sample unit, if coordinates of the temporal neighboring block are (xTnb, yTnb), the motion information of the block located at ((xTnb>>4)<<4), (yTnb>>4)<<4)) that correspond to a modified location, may be used for the temporal merge candidate. Alternatively, for example, in a case where the certain storage unit is an 8×8 sample unit, if coordinates of the temporal neighboring block are (xTnb, yTnb), the motion information of the block located at ((xTnb>>3)<<3), (yTnb>>3)<<3)) that correspond to a modified location, may be used for the temporal merge candidate.

The encoding apparatus/decoding apparatus may check whether or not the current number of merge candidates is less than the maximum number of merge candidates (S530). The maximum number of merge candidates may be predefined, or information related to the maximum number may be signaled from the encoding apparatus to the decoding apparatus. For example, the encoding apparatus may generate information related to the maximum number of the merge candidates, encode and transmit the information to the decoding apparatus in the form of a bitstream. If it reaches the maximum number of the merge candidates, the subsequent candidate adding process may not be proceeded with.

Meanwhile, when the number of merge candidates derived through the above-described process is smaller than the maximum number of merge candidates, the encoding apparatus/decoding apparatus inserts an additional merge candidate into the merge candidate list (S540). The additional merge candidate may, for example, include at least one of history based merge candidate(s), pair-wise average merge candidate(s), ATMVP, a combined bi-predictive merge candidate (when the slice/tile group type of the current slice/tile group is type B) and/or a zero vector merge candidate.

Thereafter, when the number of merge candidates derived through the above-described process is smaller than the maximum number of merge candidates, the encoding apparatus/decoding apparatus may end the construction of the merge candidate list. In this case, the encoding apparatus may select the optimal merge candidate among from the merge candidates constituting the merge candidate list based on RD(rate-distortion) cost, and signal the selection information (e.g., merge index) related to the selected merge candidate to the decoding apparatus. The decoding apparatus may select the optimal merge candidate based on the merge candidate list and the selection information.

The motion information of the selected merge candidate may be used as the motion information of the current block, and the prediction samples of the current block may be derived based on the motion information of the current block as described above. The encoding apparatus may derive residual samples of the current block based on the prediction samples, and signal the residual information on the residual samples to the decoding apparatus. As described above, the decoding apparatus may generate reconstructed samples based on the prediction samples and the residual samples derived based on the residual information, and generate the reconstructed picture based on the reconstructed samples.

Meanwhile, a merge mode with MVD (MMVD) has been proposed as a method for further improving video coding performance.

According to the MMVD, the decoding apparatus may derive a motion vector difference (MVD) based on signaled MVD information, and derive the motion information of the current block by adding the MVD to motion information derived based on the merge candidate of the current block. After one merge candidate is selected from among the merge candidates of the merge candidate list, motion information derived from the existing merge mode may be further refined based on the signaled MVD information. Here, the MVD in the MMVD may be referred to as a merge motion vector difference (mMVD).

For example, when an MMVD flag related to whether or not the MMVD is applied to the current block may be signaled and the value of the MMVD flag is 1, additional information on the MMVD may be signaled. The additional information may include a merge candidate flag. When the MMVD is applied, the merge candidate flag may be transmitted instead of the merge index. The merge candidate flag may mean an MMVD merge flag or an MMVD candidate flag. The MMVD candidate flag may indicate one merge candidate of a first merge candidate and a second merge candidate in the merge candidate list. The first merge candidate may be a merge candidate which is first in order of time in the merge candidate list, and the second merge candidate may be a merge candidate which is second in order of time in the merge candidate list. That is, in the MMVD, only two merge candidates coming earlier in order of time in the merge candidate list can be used to derive the motion information. Meanwhile, when the above-described merge index is not signaled and the value of the MMVD flag is 1, the merge index may be derived to be the same as the MMVD candidate flag. Further, when the above-described merge index is not signaled and the value of the MMVD flag is 0, the merge index may be derived as 0.

Also, the additional information may include MVD information for the current block. The MVD information may include an index used to derive a motion magnitude of the MVD of the current block, and an index used to derive a motion direction of the MVD of the current block. In this connection, for example, the index used to derive the motion magnitude of the MVD of the current block may be represented as an mMVD distance index, while the index used to derive the motion direction of the MVD of the current block may be represented as an mMVD direction index. Also, the motion magnitude of the MVD may be represented as a distance of the MVD.

The decoding apparatus may receive the MMVD flag for the current block, and when the value of the MMVD flag is 1, the decoding apparatus may receive the MMVD candidate flag, the mMVD distance index, and the mMVD direction index for the current block. The mMVD distance index may represent an index used to derive the distance of the MVD as specified in the table for the distance of the MVD of the current block, while the mMVD direction index may represent an index used to derive the direction of the MVD as specified in the table for the direction of the MVD of the current block.

The decoding apparatus may derive the mMVD of the current block based on the mMVD distance index and the mMVD direction index, and may derive the motion information of the current block based on the merge candidate indicated by the MMVD candidate flag, and the mMVD.

For example, the mMVD of the current block may be derived as follows based on the mMVD distance index and the mMVD direction index.

MmvdDistance[x0][y0] specified according to the value of the mMVD distance index may be derived as in the following table.

TABLE 1

| mmvd_distance_idx[ x0 ][ y0 ] | MmvdDistance[ x0 ][ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

Table 1 may be a table for distances of MVDs specified according to the value of the mMVD distance index. Here, (x0, y0) may represent the position of the top-left sample of the considered coding block, that is, the current block. Referring to Table 1, when the value of the mMVD distance index is 0, the MmvdDistance[x0][y0] may be derived as 1; when the value of the mMVD distance index is 1, the MmvdDistance[x0][y0] may be derived as 2; when the value of the mMVD distance index is 2, the MmvdDistance[x0][y0] may be derived as 4; when the value of the mMVD distance index is 3, the MmvdDistance[x0][y0] may be derived as 8; when the value of the mMVD distance index is 4, the MmvdDistance[x0][y0] may be derived as 16; when the value of the mMVD distance index is 5, the MmvdDistance[x0][y0] may be derived as 32; when the value of the mMVD distance index is 6, the MmvdDistance[x0][y0] may be derived as 64; and when the value of the mMVD distance index is 7, the MmvdDistance[x0][y0] may be derived as 128.

In addition, MmvdSign[x0][y0] specified according to the value of the mMVD direction index may be derived as shown in the following table.

TABLE 2

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Table 2 may be a table for the direction of the MVD specified according to the value of the mMVD direction index. The direction of the MVD may be represented as a sign of the MVD. Here, MmvdSign[x0][y0][0] may represent an x component of the mMVD code, and MmvdSign[x0][y0][1] may represent a y component of the mMVD code. Referring to Table 1, when the value of the mMVD direction index is 0, the MmvdSign[x0][y0][0] may be derived as +1, and the MmvdSign[x0][y0][1] may be derived as 0; when the value of the mMVD direction index is 1, the MmvdSign[x0][y0][0] may be derived as −1, and the MmvdSign[x0][y0][1] may be derived as 0; when the value of the mMVD direction index is 2, the MmvdSign[x0][y0][0] may be derived as 0, and the MmvdSign[x0][y0][1] may be derived as +1; and when the value of the mMVD direction index is 3, the MmvdSign[x0][y0][0] may be derived as 0, and the MmvdSign[x0][y0][1] may be derived as −1.

Then, the MMVD offset may be derived based on the MmvdDistance[x0][y0] and the MmvdSign[x0][y0] as in an equation below:

$$MmvdOffset[x0][y0][0]=(MmvdDistance[x0][y0]<<2)*MmvdSign[x0][y0][0]$$

$$MmvdOffset[x0][y0][1]=(MmvdDistance[x0][y0]<<2)*MmvdSign[x0][y0][1]$$ [Equation 1]

Here, MmvdOffset[x0][y0] may represent the MMVD offset of the current block in which the top-left sample position is (x0, y0). In addition, MmvdOffset[x0][y0][0] may represent an x component of the MMVD offset, and MmvdOffset[x0][y0][1] may represent a y component of the MMVD offset.

The decoding apparatus may derive a merge motion vector difference (mMVD) for the current block based on the MMVD offset.

For example, the motion information derived from the merge candidate for the current block may include L0 (list 0) motion information and/or L1 (list 1) motion information. Accordingly, mMVD L0 and/or mMVD L1 may be derived based on the MMVD offset. mMVD L0 may represent MVD for L0 motion information, and mMVD L1 may represent MVD for L1 motion information.

A process of deriving the mMVD for the current block based on the MMVD offset may be as shown in the following table.

TABLE 3

If both predFlagL0 and predFlagL1 are equal to 1, the following applies:
   currPocDiffL0 = DiffPicOrderCnt( CurrPic, RefPicList0[ refIdxL0 ] )
   currPocDiffL1 = DiffPicOrderCnt( CurrPic, RefPicList1[ refIdxL1 ] )
If −currPocDiffL0 * currPocDiffL1 is greater than 0, the following applies:
    mMvdL0[ 0 ] = MmvdOffset[ 0 ]
    mMvdL0[ 1 ] = MmvdOffset[ 1 ]
    mMvdL1[ 0 ] = −MmvdOffset[ 0 ]
    mMvdL1[ 1 ] = −MmvdOffset[ 1 ]
Otherwise ( −currPocDiffL0 * currPocDiffL1 is less than 0 ), the following applies:
    mMvdL0[ 0 ] − MmvdOffset[ 0 ]
    mMvdL0[ 1 ] = MmvdOffset[ 1+
    mMvdL1[ 0 ] = MmvdOffset[ 0 ]
    mMvdL1[ 1 ] =MmvdOffset[ 1]
If Abs( currPocDiffL0 ) is greater than Abs( currPocDiffL1 ), the following applies:
    td = Clip3( −128, 127, currPocDiffL0 )
    tb = Clip3( −128, 127, currPocDiffL1 )
    tx = (16384 − ( Abs(td) >> 1))/ td
    distScaleFactor = Clip3( −4096, 4095, (tb * tx + 32 ) >> 6 )
    mMvdL1[ 0 ] = Clip3( $-2^{15}$, $2^{15}-1$, Sign( distScaleFactor * mMvdL1[ 0 ]) *
    ( ( Abs( distScaleFactor * mMvdL1[ 0 ] ) + 127) >> 8 ) )

TABLE 3-continued

```
    mMvdL1[ 1 ] = Clip3( −2^15, 2^15 −1, Sign( distScaleFactor * mMvdL1[ 1 ]) *
( ( Abs( distScaleFactor * mMvdL1[ 1 ] ) + 127) >>8 ) )
Otherwise if Abs( currPocDiffL0) is less than Abs( currPocDiffL0 ), the following applies:
    td = Clip3( −128, 127, currPocDiffL1 )
    tb = Clip3( −128, 127, currPocDiffL0 )
    tx = ( 16384 − ( Abs( td ) >> 1 ) ) / td
    distScaleFactor =Clip3( −4096, 4095, (tb * tx + 32 ) >> 6 )
    mMvdL0[ 0 ] = Clip3( −2^15, 2^15 −1, Sign( distScaleFactor * mMvdL0[ 0 ]) *
( ( Abs( distScaleFactor * mMvdL0[ 0] ) + 127) >> 8 ) )
    mMvdL0[ 1 ] = Clip3( −2^15, 2^15 −1, Sign( distScaleFactor * mMvdL0[ 1 ]) *
( ( Abs( distScaleFactor * mMvdL0[ 1 ] ) + 127) >> 8 ) )
Otherwise ( predFlagL0 or predFlagL1 are equal to 1 ), the following applies for X being 0 and 1:
    mMvdLX[ 0] = ( predFlagLX = = 1 ) ? MmvdOffset[ 0 ] : 0
    mMvdLX[ 1] = ( predFlagLX = = 1 ) ? MmvdOffset] 1 ] : 0
```

Referring to Table 3 above, when L0 motion information and L1 motion information are used for the current block (predFlagL0 and predFlagL1 are equal to 1), the L0 picture order count (POC) difference and the L1 POC difference can be derived. The L0 POC difference may be derived as a value obtained by subtracting the POC of the L0 reference picture from the POC of the current picture including the current block, and the L1 POC difference may be derived as a value obtained by subtracting the POC of the L1 reference picture from the POC of the current picture. Referring to Table 3, the L0 POC difference may be represented as currPocDiffL0, and the L1 POC difference may be represented as currPocDiffL1.

Thereafter, when−currPocDiffL0*currPocDiffL1 is greater than 0, the mMVD L0 may be derived as the MMVD offset, and the mMVD L1 may be derived in the opposite direction to the MMVD offset, that is, as a value obtained by multiplying−1 to the MMVD offset.

In addition, when−currPocDiffL0*currPocDiffL1 is less than 0 and the absolute value of currPocDiffL0 is greater than the absolute value of currPocDiffL1, the mMVD L0 may be derived as the MMVD offset, and the mMVD L1 may be derived as a value obtained by multiplying the MMVD offset to a scaling factor derived based on a ratio between the L0 POC difference and the L1 POC difference.

In addition, when−currPocDiffL0*currPocDiffL1 is less than 0 and the absolute value of currPocDiffL0 is less than the absolute value of currPocDiffL1, the mMVD L1 may be derived as the MMVD offset, and the mMVD L0 may be derived as a value obtained by multiplying the MMVD offset to a scaling factor derived based on a ratio between the L0 POC difference and the L1 POC difference.

Meanwhile, referring to Table 3 above, when L0 motion information or L1 motion information is used for the current block (predFlagL0 or predFlagL1 is equal to 1), the mMVD L0 or the mMVD L1 may be derived as the MMVD offset. That is, when only L0 motion information is used for the current block, the mMVD L0 may be derived as the MMVD offset, while, when only L1 motion information is used for the current block, the mMVD L1 is derived as the MMVD offset.

Meanwhile, when merge motion vector difference (mMVD) is used as described above, current picture referencing (CPR) may be used. The CPR may represent a method in which the reference picture of the motion information of the current block is the current picture. That is, the CPR may mean a method of referring to the current picture being decoded for prediction of the current block. In this case, since prediction is performed using a reference image of integer sample precision without interpolation of a reference image for the current block in order to derive prediction samples for the current block due to the characteristics of CPR, the mMVD should also be designed in integer sample precision. That is, since a fractional sample unit is not used and an integer sample unit can be used for the motion vector of the current block, the magnitude for deriving the MMVD needs to be different. Therefore, for mMVD, the integer sample precision needs to be used instead of the fractional sample precision. Accordingly, this document proposes a method of deriving MMVD so that the CPR characteristic can be taken into consideration while maintaining the existing MMVD distance table such as Table 1 above. Through this, MMVD and CPR can be efficiently used for image coding, and overall coding efficiency can be improved.

For example, this document may propose an embodiment of deriving the magnitude of the MMVD based on whether or not the merge candidate indicated by the MMVD candidate flag of the current block uses the current picture as a reference picture. That is, this document may propose an embodiment of deriving the magnitude of the MMVD based on whether integer sample precision or fractional sample precision is used in a merge mode with MVD (MMVD) applied to the current block may be proposed.

Specifically, according to this embodiment, a shift value may be derived based on whether or not the merge candidate indicated by the MMVD candidate flag uses the current picture as the reference picture. The shift value may be represented as MmvdDistancePrecisionShift.

For example, an equation for deriving an MMVD offset using a shift value derived based on whether or not a merge candidate uses a current picture as a reference picture may be as follows.

$$MmvdOffset[x0][y0][0]=(MmvdDistance[x0][y0]<<MmvdDistancePrecisionShift)*MmvdSign[x0][y0][0]$$

$$MmvdOffset[x0][y0][1]=(MmvdDistance[x0][y0]<<MmvdDistancePrecisionShift)*MmvdSign[x0][y0][1]$$ [Equation 2]

For example, when a merge candidate indicated by the MMVD candidate flag uses a current picture as a reference picture, the shift value may be derived as 4, while, when the merge candidate indicated by the MMVD candidate flag does not use a current picture as a reference picture, the shift value may be derived as 2. In other words, when the integer sample precision is used in the MMVD applied to the current block, the shift value may be derived as 4, while, when the fractional sample precision is used in the MMVD applied to the current block, the shift value may be derived as 2. The case where the integer sample precision is used in the MMVD may represent a case where the integer sample precision is used for motion information in the MMVD. That is, it may represent whether the motion information has a value represented in the integer sample precision or a value represented in the fractional sample precision. Accordingly, when the MMVD is applied to the current block and the integer sample precision is used for motion information of the current block, the shift value may be derived as 4, while, when the fractional sample precision is used for the motion information of the current block, the shift value may be derived as 2.

Through this, when the integer sample precision is used, the magnitude of the MMVD can be derived as a value four times greater than the magnitude of the MMVD of a case where the fractional sample precision is used.

Figure 6:
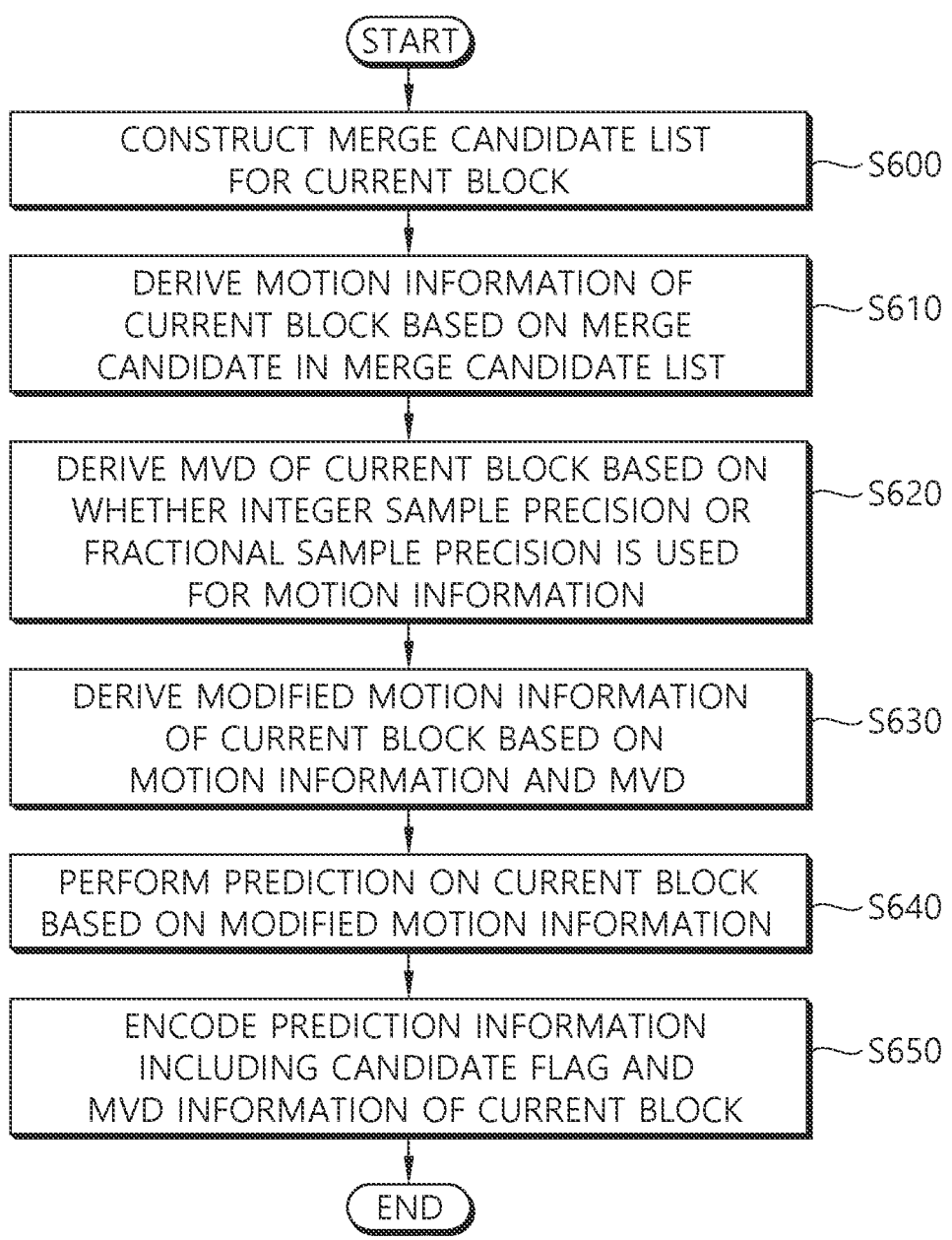
FIG. 6 schematically shows an image encoding method by an encoding apparatus according to this document.

The process of deriving the MMVD according to this embodiment may be as shown in the following table.

method disclosed in FIG. 6 may be performed by the encoding apparatus disclosed in FIG. 2. Specifically, for example, S600 to S640 in FIG. 6 may be performed by the predictor of the encoding apparatus, and S650 may be performed by the entropy encoder of the encoding apparatus. Further, although not shown in the drawings, the process of deriving a residual sample for the current block based on the original sample and the prediction sample for the current block may be performed by the subtractor of the encoding apparatus; the process of generating a reconstructed picture based on a residual sample and a prediction sample for the current block may be performed by an adder of the encoding device; the process of generating residual information for the current block based on the residual sample may be performed by the transformer of the encoding apparatus; and

TABLE 4

Derivation process for merge motion vector difference
Inputs to this process are:
a luma location ( xCb, yCb ) of the top-left sample of the current luma coding block
relative to the top-left luma sample of the current picture,
reference indices refIdxL0 and refIdxL1,
prediction list utilization flags predFlagL0 and predFlagL1.
Outputs of this process are the luma merge motion vector differences in 1/16 fractional-
sample accuracy mMvdL0 and mMvdL1.
The variable currPic specifies the current picture.
The luma merge motion vector differences mMvdL0 and mMvdL1 are derived as follows:
The variable MmvdDistancePrecisionShift is derived as follow:
if mergeCandList[ mmvd_merge_flag[ x0 ][ y0 ]] uses the current decoded picture as
its reference picture, MmvdDistancePrecisionShift is specified 4
other, MmvdDistancePrecisionShift is specified 2
Both components of of the merge plus MVD offset MmvdOffset[ x0 ][ y0 ] are derived as
follows:
MmvdOffset[ x0 ][ y0 ][0] = ( MmvdDistance[ x0 ][ y0 ] << MmvdDistancePrecisionShift ) * Mmvd
Sign[ x0 ][ y0 ][0] (7-70)
MmvdOffset[ x0 ][ y0 ][1] = ( MmvdDistance[ x0 ][ y0 ] << MmvdDistancePrecisionShift ) * Mmvd
Sign[ x0 ][ y0 ][1] (7-71)
If both predFlagL0 and predFlagL1 are equal to 1, the following applies:
currPocDiffL0 = DiffPicOrderCnt( currPic, RefPicList0[ refIdxL0 ] )
currPocDiffL1 = DiffPicOrderCnt( currPic, RefPicList1[ refIdxL1 ] )

If −currPocDiffL0 * currPocDiffL1 is greater than 0, the following applies:
mMvdL0[ 0 ] = MmvdOffset[ 0 ]
mMvdL0[ 1 ] = MmvdOffset[ 1 ]
mMvdL1[ 0 ] = −MmvdOffset[ 0 ]
mMvdL1[ 1 ] = −MmvdOffset[ 1 ]
Otherwise ( −currPocDiffL0 * currPocDiffL1 is less than 0 ), the following applies:
mMvdL0[ 0 ] = MmvdOffset[ 0 ]
mMvdL0[ 1 ] = MmvdOffset[ 1 ]
mMvdL1[ 0 ] = MmvdOffset[ 0 ]
mMvdL1[ 1 ] = MmvdOffset[ 1 ]
If Abs( currPocDiffL0 ) is greater than Abs( currPocDiffL1 ), the following applies:
td = Clip3( −128, 127, currPocDiffL1 )
tb = Clip3( −128, 127, currPocDiffL0 )
tx= ( 16384 + ( Abs(td ) >> 1 ))/td
distScaleFactor = Clip3( −4096, 4095, (tb * tx + 32 ) >> 6 )
mMvdL1[ 0] = Clip3( $-2^{15}$, $2^{15}$ − 1, Sign( distScaleFactor * mMvdL1[ 0 ]) *
( ( Abs( distScaleFactor * mMvdL1[ 0 ] ) + 127) >> 8 ) )
mMvdL1[ 1] = Clip3( $-2^{15}$, $2^{15}$ − 1, Sign( distScaleFactor * mMvdL1[ 1 ]) *
( ( Abs( distScaleFactor * mMvdL1[ 1 ] ) + 127) >> 8 ) )
Otherwise if Abs( currPocDiffL0) is less than Abs( currPocDiffL0 ), the following applies:
td =Clip3( −128, 127, currPocDiffL1 )
tb =Clip3( −128, 127, currPocDiffL0 )
tx = ( 16384 + ( Abs( td ) >> 1 ) ) / td
distScaleFactor =Clip3( −4096, 4095, (tb * tx + 32 ) >> 6 )
mMvdL0[ 0] = Clip3( $-2^{15}$, $2^{15}$ − 1, Sign( distScaleFactor * mMvdL0[ 0 ]) *
( ( Abs( distScaleFactor * mMvdL0[ 0] ) + 127) >> 8 ) )
mMvdL0[ 1] = Clip3( $-2^{15}$, $2^{15}$ − 1, Sign( distScaleFactor * mMvdL0[ 1 ]) *
( ( Abs( distScaleFactor * mMvdL0[ 1 ] ) + 127) >> 8 ) )
Otherwise ( predFlagL0 or predFlagL1 are equal to 1 ), the following applies for X being 0 and 1:
mMvdLX[ 0 ] =( predFlagLX = = 1) ? MmvdOffset[ 0 ] : 0
mMvdLX[ 1 ] = ( predFlagLX = = 1 ) ? MmvdOffset [ 1 ] : 0

FIG. 6 schematically shows an image encoding method by an encoding apparatus according to this document. The process of encoding the residual information may be performed by an entropy encoder of the encoding apparatus.

The encoding apparatus constructs a merge candidate list for the current block (S600).

The encoding apparatus may construct a merge candidate list for the current block based on neighboring blocks of the current block. The neighboring blocks may include spatial neighboring blocks and/or temporal neighboring blocks. For example, motion information of the spatial neighboring blocks and/or the temporal neighboring blocks may be derived as a merge candidate for the current block, and the merge candidate list including the merge candidate may be constructed.

Also, for example, the spatial neighboring blocks may include a left neighboring block, a top neighboring block, a top-right corner neighboring block, a bottom-left corner neighboring block, and/or a top-left corner neighboring block. If the size of the current block is W×H, and an x component of the top-left sample position of the current block is x0 and a y component thereof is y0, then the bottom-left corner neighboring block may be a block including a sample at coordinates (x0−1, y0+H); the left neighboring block, a block including a sample at coordinates (x0−1, y0+H−1); the top-right corner neighboring block, a block including a sample at coordinates (x0+W, y0−1); the top neighboring block, a block including a sample at coordinates (x0+W−1, y0−1); and the top-left corner neighboring block, a block including a sample at coordinates (x0−1, y0−1). That is, the left neighboring block may be a left neighboring block among the left neighboring blocks of the current block, which is located lowermost, and the top neighboring block may be a top neighboring block among the top neighboring blocks of the current block, which is located leftmost.

Furthermore, for example, the temporal neighboring blocks may include a center bottom-right block of the co-located block of the current block in a collocated picture, and/or a bottom-right corner neighboring block of the co-located block. The co-located block may represent a block located at a position in the collocated picture corresponding to the position of the current block.

The encoding apparatus derives motion information of the current block based on a merge candidate in the merge candidate list (S610). The encoding apparatus may determine that one prediction mode is applied to the current block among various prediction modes. For example, the encoding apparatus may determine a merge mode with motion vector difference (MMVD) as the prediction mode of the current block. In this case, the encoding apparatus may select one merge candidate from among the first merge candidate and the second merge candidate of the merge candidate list, and may derive the selected merge candidate as the motion information of the current block. The motion information may include a motion vector and a reference picture index of the current block. The first merge candidate may be a merge candidate which is first in order of time in the merge candidate list, and the second merge candidate may be a merge candidate which is second in order of time in the merge candidate list.

Further, the encoding apparatus may generate and encode a candidate flag indicating the selected merge candidate among the merge candidates in the merge candidate list. The prediction information of the current block may include the candidate flag, and the candidate flag may represent the above-described MMVD candidate flag. The candidate flag may indicate one of the merge candidates in the merge candidate list. For example, the candidate flag may indicate one of a first merge candidate and a second merge candidate in the merge candidate list. The first merge candidate may be a merge candidate which is first in order of time in the merge candidate list, and the second merge candidate may be a merge candidate which is second in order of time in the merge candidate list. When the value of the candidate flag is 0, the candidate flag may indicate the first merge candidate in the merge candidate list, while, when the value of the candidate flag is 1, the candidate flag may indicate the second merge candidate in the merge candidate list.

The encoding apparatus derives the MVD of the current block based on whether integer sample precision or fractional sample precision is used for the motion information (S620).

For example, the encoding apparatus may determine the MVD distance for the current block from a table for the MVD distance, and may determine the MVD direction for the current block from a table for the MVD direction. For example, the table for the MVD distance may be the same as Table 1 described above, and the table for the MVD direction may be the same as Table 2 described above. In Table 1, mmvd_distance_idx[x0][y0] may represent the MVD distance index, and MmvdDistance[x0][y0] may represent the MVD distance. Further, in Table 2, mmvd_distance_idx[x0][y0] may represent the MVD direction index; MmvdSign[x0][y0][0], an x component of the MVD direction; and MmvdSign[x0][y0][1], a y component of the MVD direction.

Further, the encoding apparatus may derive a shift value based on whether the integer sample precision or the fractional sample precision is used for the motion information. For example, when the integer sample precision is used for the motion information, the shift value may be derived as 4, while, when the fractional sample precision is used for the motion information, the shift value may be derived as 2. Through this, the magnitude of the MVD offset of the current block of a case where the integer sample precision is used for the motion information may be 4 times greater than the magnitude of the MVD offset of the current block of a case where the fractional sample precision is used for the motion information.

Also, for example, if the reference picture indicated by the reference picture index of the motion information of the current block is the current picture including the current block, integer sample precision may be used for the motion information, while, if the reference picture indicated by the reference picture index of the motion information of the current block is not the current picture, fractional sample precision may be used for the motion information. Accordingly, when the reference picture indicated by the reference picture index of the motion information of the current block is the current picture including the current block, the shift value may be derived as 4, while, when the reference picture indicated by the reference picture index of the motion information of the current block is not the current picture, the shift value may be derived as 2. Through this, the magnitude of the MVD offset of the current block of a case where the reference picture indicated by the reference picture index is the current picture may be 4 times greater than the magnitude of the MVD offset of the current block of a case where the reference picture indicated by the reference picture index is not the current picture.

Also, the motion information of the current block may be derived from motion information of a merge candidate indicated by the candidate flag. Consequently, for example, when the reference picture indicated by the reference picture index of the merge candidate is the current picture including the current block, the shift value may be derived as 4, while, when the reference picture indicated by the reference picture index of the merge candidate is not the current picture, the shift value may be derived as 2.

Thereafter, the encoding apparatus may derive the MVD offset of the current block based on the MVD distance, the MVD direction, and the shift value. For example, the MVD offset may be derived based on Equation 2 described above. In Equation 2 above-described, MmvdOffset[x0][y0][0] may denote an x component of the MVD offset; MmvdOffset[x0][y0][1], a y component of the MVD offset; MmvdDistance[x0][y0], the MVD distance; MmvdDistancePrecisionShift, the shift value; MmvdSign[x0][y0][0], an x component of the MVD direction; and MmvdSign[x0][y0][1], a y component of the MVD direction.

Also, the encoding apparatus may generate and encode MVD information for the MVD of the current block. The prediction information of the current block may include MVD information of the current block. The MVD information may include an MVD distance index and an MVD direction index. The MVD distance index may represent the above-described mMVD distance index, and the MVD direction index may represent the above-described mMVD direction index. Here, the MVD distance index may indicate the MVD distance of the current block. That is, the MVD distance index may represent an index used to derive the MVD distance as specified in a table for MVD distance. The MVD distance indicated by the value of the MVD distance index in the table for the MVD distance may be derived as the MVD distance of the current block. The table for the MVD distance may be the same as Table 1 described above. Additionally, the MVD direction index may indicate the MVD direction of the current block. That is, the MVD direction index may represent an index used to derive the MVD direction as specified in a table for the MVD direction. The MVD direction indicated by the value of the MVD direction index in the table for the MVD direction may be derived as the MVD direction of the current block. The table for the MVD direction may be the same as Table 2 described above.

The encoding apparatus derives modified motion information of the current block based on the motion information and the MVD (S630). For example, the encoding apparatus may derive a modified motion vector by adding the MVD to the motion vector of the motion information, and may derive the modified motion information including the modified motion vector. In other words, the modified motion information may include the modified motion vector, and the modified motion vector may be derived through addition of the motion vector of the motion information and the MVD.

The encoding apparatus performs prediction on the current block based on the modified motion information (S640). The encoding apparatus may derive a prediction sample of the current block by performing prediction on the current block based on the modified motion information. The prediction block of the current block may be derived based on the modified motion information, and a reconstructed picture may be generated based on the prediction block. Specifically, the encoding apparatus may derive the reference block in the reference picture based on the modified motion information. The modified motion information may include the modified motion vector and a reference picture index. The encoding apparatus may derive, as the reference picture of the current block, one of the reference pictures in the reference picture list, which the reference picture index indicates, and may derive, as the reference block of the current block, the block in the reference picture, which the modified motion vector indicates. The reference pictures may include a current picture including the current block. The encoding apparatus may generate the prediction sample based on the reference block.

Further, although not shown in the drawings, the encoding apparatus may generate a residual sample based on the original sample of the current block and the generated prediction sample. The encoding apparatus may generate residual information of the current block based on the residual sample. The residual information may include transform coefficients relating to the residual sample. The encoding apparatus may derive the reconstructed sample based on the prediction sample and the residual sample. That is, the encoding apparatus may derive the reconstructed sample by adding the prediction sample and the residual sample, and may generate a reconstructed picture based on the reconstructed sample. Further, the encoding apparatus may encode the residual information, and output the encoded information in the form of a bitstream. The bitstream may be transmitted to the decoding apparatus through a network or a storage medium.

The encoding apparatus encodes prediction information including a candidate flag and MVD information of the current block (S650). The encoding apparatus may encode prediction information including the candidate flag and MVD information of the current block. For example, the encoding apparatus may encode image information including prediction information of the current block, and output the encoded image information in the form of a bitstream. The bitstream may be transmitted to the decoding apparatus through a network or a storage medium.

Additionally, the encoding apparatus may determine a prediction mode of the current block, and generate information related to the prediction mode. For example, the encoding apparatus may determine a merge mode with motion vector difference (MMVD) as the prediction mode of the current block, and may generate and encode an MMVD flag related to whether or not the MMVD is applied to the current block. The prediction information may include the MMVD flag.

Also, for example, the encoding apparatus may generate and encode a candidate flag and MVD information of the current block. The prediction information may include a candidate flag and MVD information of the current block. The MVD information may include an MVD distance index and an MVD direction index. The candidate flag may represent the above-described MMVD candidate flag; the MVD distance index, the above-described mMVD distance index; and the MVD direction index, the above-described mMVD direction index. Here, the candidate flag may indicate one of a first merge candidate and a second merge candidate in the merge candidate list of the current block. The first merge candidate may be a merge candidate which is first in order of time in the merge candidate list, and the second merge candidate may be a merge candidate which is second in order of time in the merge candidate list. Further, the MVD distance index may indicate the MVD distance of the current block. That is, the MVD distance index may represent an index used to derive the MVD distance as specified in a table for MVD distance. The MVD distance indicated by the value of the MVD distance index in the table for the MVD distance may be derived as the MVD distance of the current block. The table for the MVD distance may be the same as Table 1 described above. Additionally, the MVD direction index may indicate the MVD direction of the current block. That is, the MVD direction index may represent an index used to derive the MVD direction as specified in a table for the MVD direction. The MVD direction indicated by the value of the MVD direction index in the table for the MVD direction may be derived as the MVD direction of the current block. The table for the MVD direction may be the same as Table 2 described above.

Although not shown in the drawings, the encoding apparatus may generate residual information of the current block based on the residual sample. The image information may include information on residual, and the residual information may include transform coefficients relating to the residual sample. The encoding apparatus may encode the residual information, and output the encoded information in the form of a bitstream.

Meanwhile, the bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 7:
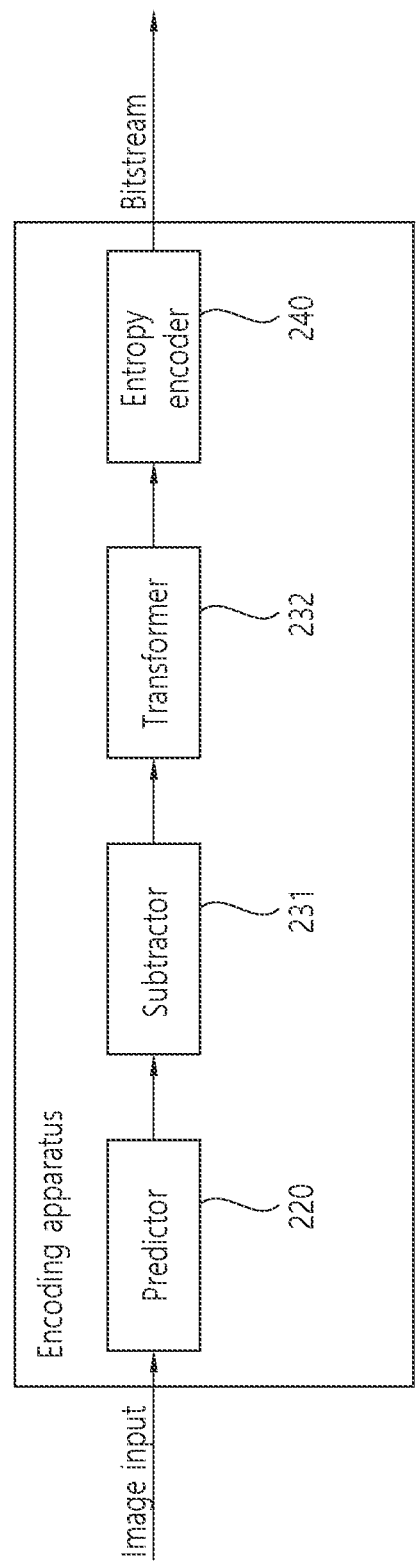
FIG. 7 schematically shows an encoding apparatus performing an image encoding method according to this document.

FIG. 7 schematically shows an encoding apparatus performing an image encoding method according to this document. The method disclosed in FIG. 7 may be performed by the encoding apparatus disclosed in FIG. 6. Specifically, for example, the predictor of the encoding apparatus of FIG. 7 may perform S600 to S640 of FIG. 6, and the entropy encoder of the encoding apparatus of FIG. 7 may perform S650 of FIG. 6. Further, although not shown, the process of deriving the residual sample of the current block based on the original sample and the prediction sample of the current block may be performed by the subtractor of the encoding apparatus in FIG. 7; the process of deriving the reconstructed sample for the current block based on the residual sample and the prediction sample of the current block may be performed by the adder of the encoding apparatus in FIG. 7; the process of generating residual information of the current block based on the residual sample may be performed by the transformer of the encoding apparatus in FIG. 7; and the process of encoding the residual information may be performed by an entropy encoder of the encoding apparatus in FIG. 7.

Figure 8:
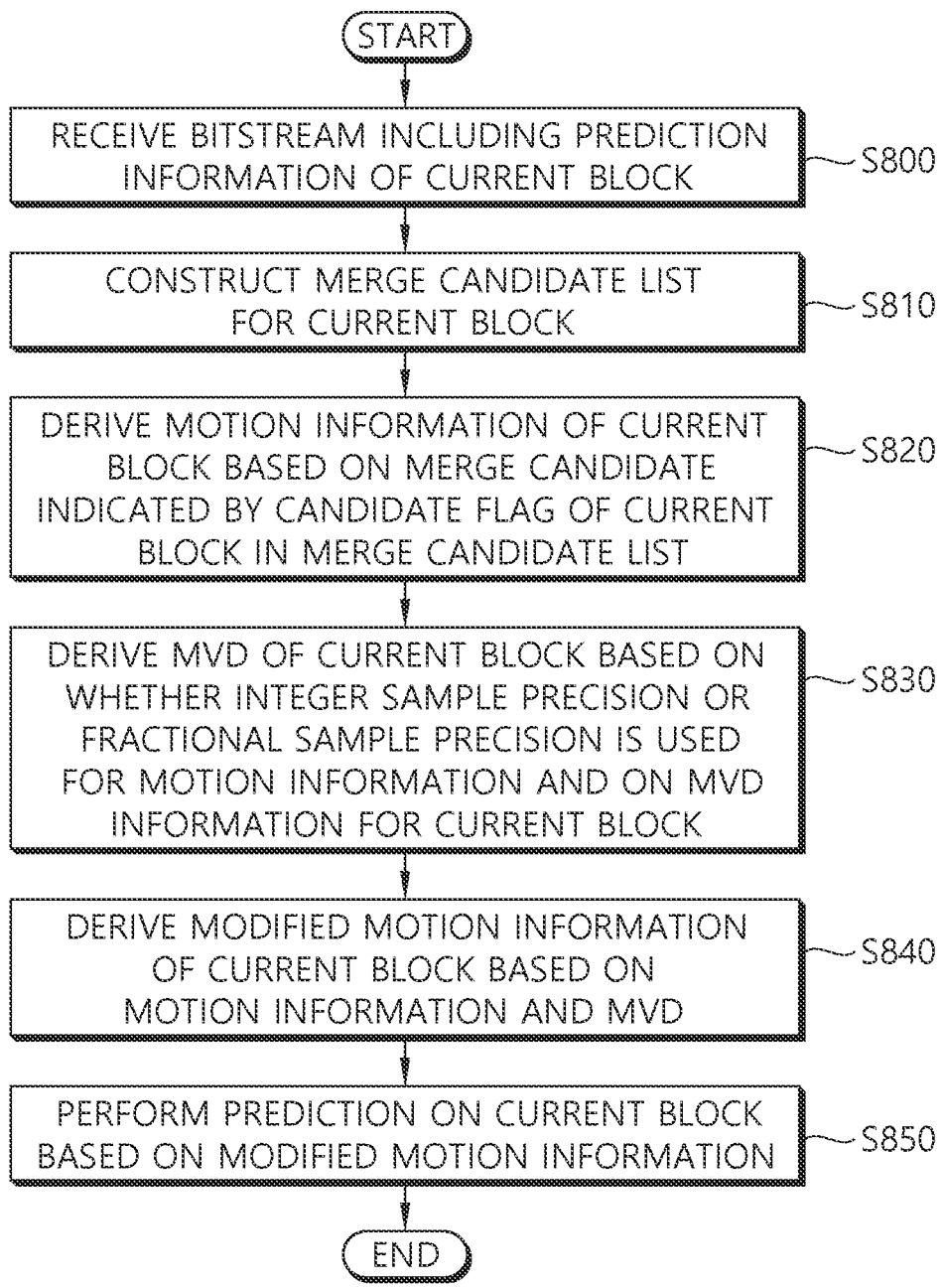
FIG. 8 schematically shows an image decoding method by a decoding apparatus according to this document.

FIG. 8 schematically shows an image decoding method by a decoding apparatus according to this document. An image decoding method by a decoding apparatus according to this document is schematically shown. The method disclosed in FIG. 8 may be performed by the decoding apparatus disclosed in FIG. 3. Specifically, for example, S800 in FIG. 8 may be performed by the entropy decoder of the decoding apparatus, and S810 to S850 may be performed by the predictor of the decoding apparatus. Further, although not shown, the process of obtaining the residual information for the current block through a bitstream may be performed by the entropy decoder of the decoding apparatus, the process of deriving the residual sample for the current block based on the residual information may be performed by the inverse transformer of the decoding apparatus, and the process of generating a reconstructed picture based on the prediction sample and the residual sample may be performed by the adder of the decoding apparatus.

The decoding apparatus receives a bitstream including prediction information of the current block (S800). The decoding apparatus may receive prediction information on the current block through the bitstream. For example, the decoding apparatus may receive image information including prediction information of the current block through a bitstream. The image information may include the prediction information of the current block. The prediction information may include information on an inter prediction mode or an intra prediction mode performed on the coding block.

For example, the prediction information may include an MMVD flag related to whether or not a merge mode with motion vector difference (MMVD) is applied to the current block. Also, for example, when the value of the MMVD flag is 1, the prediction information may include a candidate flag and MVD information of the current block. The MVD information may include an MVD distance index and an MVD direction index. The candidate flag may represent the above-described MMVD candidate flag; the MVD distance index, the above-described mMVD distance index; and the MVD direction index, the above-described mMVD direction index. Here, the candidate flag may indicate one of a first merge candidate and a second merge candidate in the merge candidate list of the current block. The first merge candidate may be a merge candidate which is first in order of time in the merge candidate list, and the second merge candidate may be a merge candidate which is second in order of time in the merge candidate list. Further, the MVD distance index may indicate the MVD distance of the current block. That is, the MVD distance index may represent an index used to derive the MVD distance as specified in a table for MVD distance. The MVD distance indicated by the value of the MVD distance index in the table for the MVD distance may be derived as the MVD distance of the current block. The table for the MVD distance may be the same as Table 1 described above. Additionally, the MVD direction index may indicate the MVD direction of the current block. That is, the MVD direction index may represent an index used to derive the MVD direction as specified in a table for the MVD direction. The MVD direction indicated by the value of the MVD direction index in the table for the MVD direction may be derived as the MVD direction of the current block. The table for the MVD direction may be the same as Table 2 described above.

Meanwhile, for example, the decoding apparatus may receive image information including residual information of the current block through a bitstream. The image information may include residual information on the coding block. The residual information may include a transform coefficient related to the residual sample. The decoding apparatus may derive the residual sample (or residual sample array) of the current block based on the residual information.

The decoding apparatus constructs a merge candidate list for the current block (S810).

The decoding apparatus may construct a merge candidate list for the current block based on neighboring blocks of the current block. The neighboring blocks may include spatial neighboring blocks and/or temporal neighboring blocks. For example, motion information of the spatial neighboring blocks and/or the temporal neighboring blocks may be derived as a merge candidate for the current block, and the merge candidate list including the merge candidate may be constructed.

Also, for example, the spatial neighboring blocks may include a left neighboring block, a top neighboring block, a top-right corner neighboring block, a bottom-left corner neighboring block, and/or a top-left corner neighboring block. If the size of the current block is W×H, and an x component of the top-left sample position of the current block is x0 and a y component thereof is y0, then the bottom-left corner neighboring block may be a block including a sample at coordinates (x0−1, y0+H); the left neighboring block, a block including a sample at coordinates (x0−1, y0+H−1); the top-right corner neighboring block, a block including a sample at coordinates (x0+W, y0−1); the top neighboring block, a block including a sample at coordinates (x0+W−1, y0−1); and the top-left corner neighboring block, a block including a sample at coordinates (x0−1, y0−1). That is, the left neighboring block may be a left neighboring block among the left neighboring blocks of the current block, which is located lowermost, and the top neighboring block may be a top neighboring block among the top neighboring blocks of the current block, which is located leftmost.

Furthermore, for example, the temporal neighboring blocks may include a center bottom-right block of the co-located block of the current block in a collocated picture, and/or a bottom-right corner neighboring block of the co-located block. The co-located block may represent a block located at a position in the collocated picture corresponding to the position of the current block.

The decoding apparatus derives the motion information of the current block based on the merge candidate indicated by the candidate flag of the current block in the merge candidate list (S820).

The prediction information may include the candidate flag. The candidate flag may indicate one of the merge candidates in the merge candidate list. For example, the candidate flag may indicate one of a first merge candidate and a second merge candidate in the merge candidate list. The first merge candidate may be a merge candidate which is first in order of time in the merge candidate list, and the second merge candidate may be a merge candidate which is second in order of time in the merge candidate list. When the value of the candidate flag is 0, the candidate flag may indicate the first merge candidate in the merge candidate list, while, when the value of the candidate flag is 1, the candidate flag may indicate the second merge candidate in the merge candidate list.

The decoding apparatus may derive, as motion information of the current block, the merge candidate indicated by a candidate flag of the current block in the merge candidate list. The motion information may include a motion vector and a reference picture index of the current block.

The decoding apparatus derives an MVD of the current block based on whether integer sample precision or fractional sample precision is used for the motion information, and on MVD information for the current block (S830).

For example, the decoding apparatus may derive the MVD distance indicated by the value of the MVD distance index from a table for MVD distance, and may derive the MVD direction indicated by the value of the MVD direction index from a table for the MVD direction. For example, the table for the MVD distance may be the same as Table 1 described above, and the table for the MVD direction may be the same as Table 2 described above. In Table 1, mmvd_distance_idx[x0][y0] may represent the MVD distance index, and MmvdDistance[x0][y0] may represent the MVD distance. Further, in Table 2, mmvd_direction_idx[x0][y0] may represent the MVD direction index; MmvdSign[x0][y0][0], an x component of the MVD direction; and MmvdSign[x0][y0][1], a y component of the MVD direction.

Further, the decoding apparatus may derive a shift value based on whether the integer sample precision or the fractional sample precision is used for the motion information. For example, when the integer sample precision is used for the motion information, the shift value may be derived as 4, while, when the fractional sample precision is used for the motion information, the shift value may be derived as 2. Through this, the magnitude of the MVD offset of the current block of a case where the integer sample precision is used for the motion information may be 4 times greater than the magnitude of the MVD offset of the current block of a case where the fractional sample precision is used for the motion information.

Also, for example, if the reference picture indicated by the reference picture index of the motion information of the current block is the current picture including the current block, integer sample precision may be used for the motion information, while, if the reference picture indicated by the reference picture index of the motion information of the current block is not the current picture, fractional sample precision may be used for the motion information. Accordingly, when the reference picture indicated by the reference picture index of the motion information of the current block is the current picture including the current block, the shift value may be derived as 4, while, when the reference picture indicated by the reference picture index of the motion information of the current block is not the current picture, the shift value may be derived as 2. Through this, the magnitude of the MVD offset of the current block of a case where the reference picture indicated by the reference picture index is the current picture may be 4 times greater than the magnitude of the MVD offset of the current block of a case where the reference picture indicated by the reference picture index is not the current picture.

Also, the motion information of the current block may be derived from motion information of a merge candidate indicated by the candidate flag. Consequently, for example, when the reference picture indicated by the reference picture index of the merge candidate is the current picture including the current block, the shift value may be derived as 4, while, when the reference picture indicated by the reference picture index of the merge candidate is not the current picture, the shift value may be derived as 2.

Thereafter, the decoding apparatus may derive the MVD offset of the current block based on the MVD distance, the MVD direction, and the shift value. For example, the MVD offset may be derived based on Equation 2 described above. In Equation 2 above-described, MmvdOffset[x0][y0][0] may denote an x component of the MVD offset; MmvdOffset[x0][y0][1], a y component of the MVD offset; MmvdDistance[x0][y0], the MVD distance; MmvdDistancePrecisionShift, the shift value; MmvdSign[x0][y0][0], an x component of the MVD direction; and MmvdSign[x0][y0][1], a y component of the MVD direction.

The decoding apparatus derives modified motion information of the current block based on the motion information and the MVD (S840). For example, the decoding apparatus may derive a modified motion vector by adding the MVD to the motion vector of the motion information, and may derive the modified motion information including the modified motion vector. In other words, the modified motion information may include the modified motion vector, and the modified motion vector may be derived through addition of the motion vector of the motion information and the MVD.

The decoding apparatus performs prediction on the current block based on the modified motion information (S850). The decoding apparatus may derive a prediction sample of the current block by performing prediction on the current block based on the modified motion information.

For example, the prediction block of the current block may be derived based on the modified motion information, and a reconstructed block may be derived based on the prediction block. Specifically, the decoding apparatus may derive the reference block in the reference picture based on the modified motion information. The modified motion information may include the modified motion vector and a reference picture index. The decoding apparatus may derive, as a reference picture of the current block, a reference picture indicated by the reference picture index, and may derive, as the reference block of the current block, the block indicated by the modified motion vector in the reference picture. The decoding apparatus may generate a prediction sample based on the reference block, or use the prediction sample directly as a reconstructed sample according to the prediction mode, or generate a reconstructed sample by adding a residual sample to the prediction sample. When there is a residual sample for the current block, the decoding apparatus may obtain residual information of the current block from the bitstream. The residual information may include a transform coefficient relating to the residual sample. The decoding apparatus may derive the residual sample (or residual sample array) of the current block based on the residual information. The decoding apparatus may generate the reconstructed sample based on the prediction sample and the residual sample, and derive a reconstructed block or reconstructed picture based on the reconstructed sample. Thereafter, as described above, the decoding apparatus may apply an in-loop filtering process such as deblocking filtering and/or an SAO process to the reconstructed picture in order to improve subjective/objective video quality, as needed.

Figure 9:
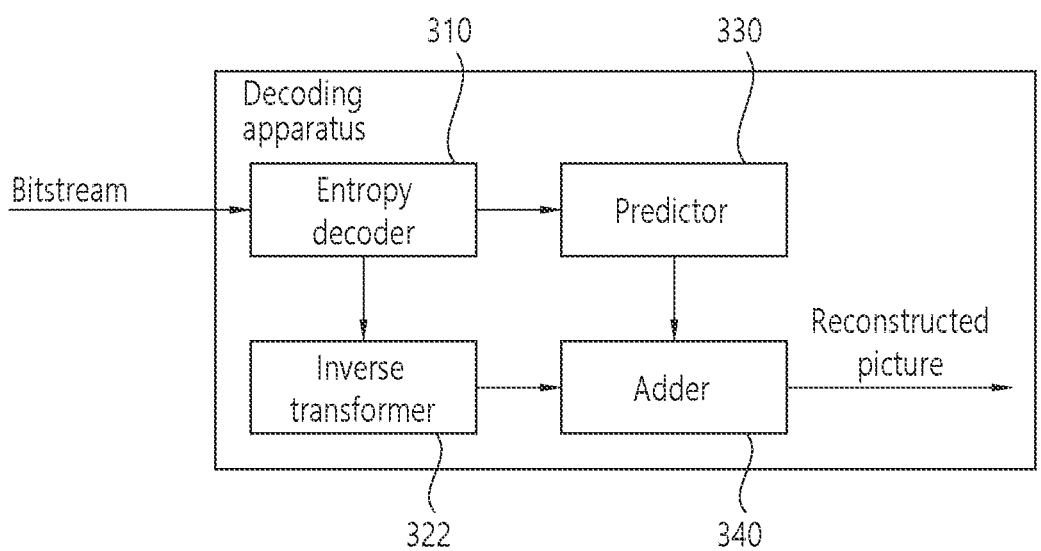
FIG. 9 schematically shows a decoding apparatus for performing an image decoding method according to the document.

FIG. 9 schematically shows a decoding apparatus for performing an image decoding method according to the document. The method disclosed in FIG. 8 may be performed by the decoding apparatus disclosed in FIG. 9. Specifically, for example, the entropy decoder of the decoding apparatus of FIG. 9 may perform S800 of FIG. 8, and the predictor of the decoding apparatus of FIG. 9 may perform S800 to S850 in FIG. 8. Further, although not shown, the process of obtaining image information including residual information of the current block through a bitstream may be performed by the entropy decoder of the decoding apparatus of FIG. 9, and the process of deriving the residual sample of the current block based on the residual information may be performed by the inverse transformer of the decoding apparatus of FIG. 9, and the process of generating a reconstructed picture based on the prediction sample and the residual sample may be performed by the adder of the decoding apparatus of FIG. 9.

According to this document described above, it is possible to improve overall image/video compression efficiency.

In addition, according to this document, the MVD can be derived based on the signaled MMVD index information and a pre-defined table, and the prediction can be performed by deriving motion information of the current block based on the derived MVD and the merge candidate of the current block, through which the amount of bits for transmitting the MVD can be reduced, thus improving overall coding efficiency.

Additionally, according to this document, the MMVD using the integer sample precision or the fractional sample precision can be derived considering the case where current picture referencing (CPR) is applied while using the existing MMVD distance table, and through this, the MMVD and the CPR can be efficiently used for image coding, thus improving overall coding efficiency.

A subblock-based temporal merge candidate can be derived by referring only to a motion vector of a left neighboring block among neighboring blocks of the current block, and through this, it is possible to reduce the operational complexity of the process of deriving a subblock-based temporal merge candidate and the process of constructing the merge candidate list, and improve the coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 10:
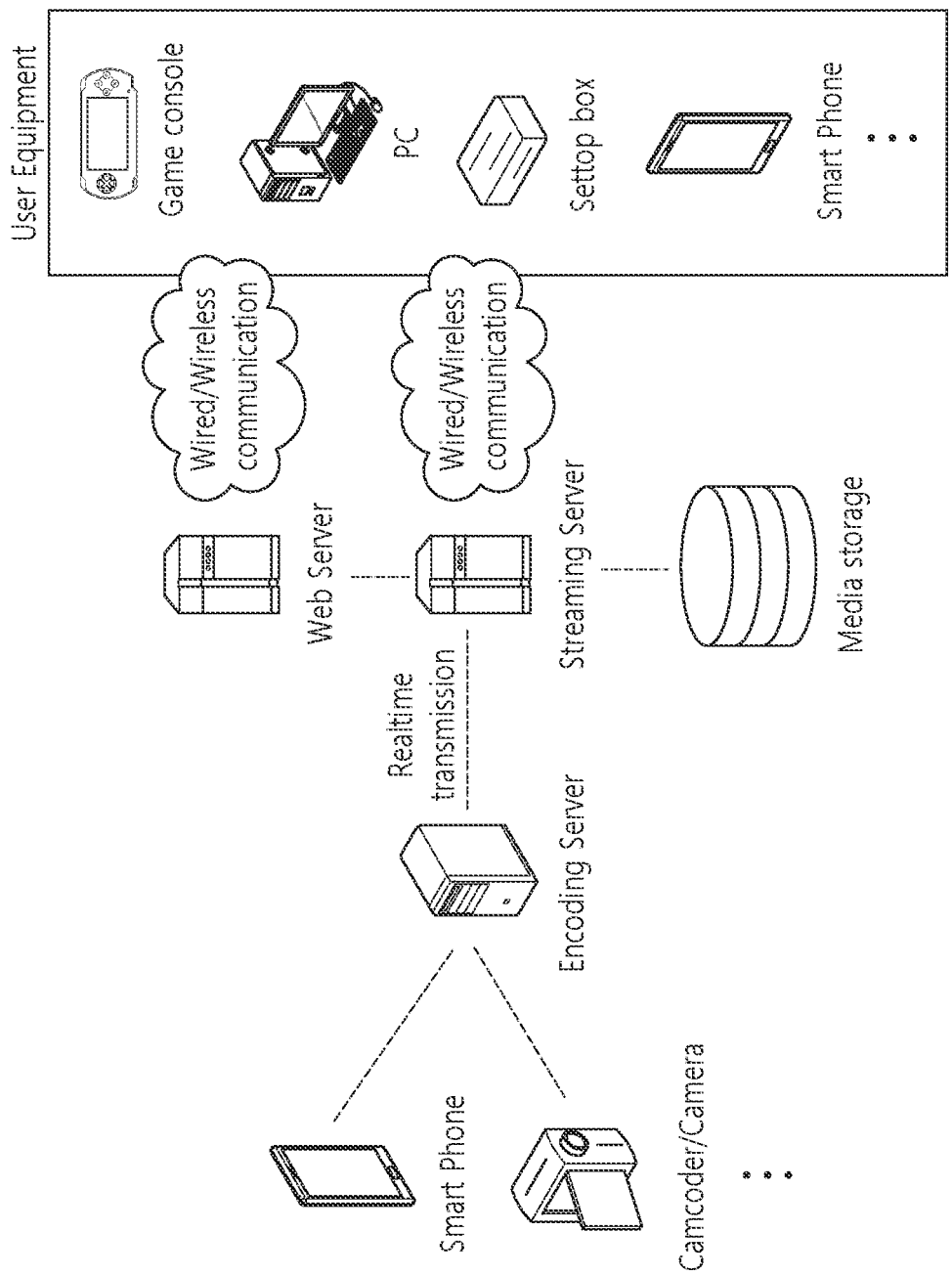
FIG. 10 illustrates a structural diagram of a contents streaming system to which the present disclosure is applied.

FIG. 10 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, the image decoding method comprising:
receiving a bitstream including prediction information of a current block;
constructing a merge candidate list for the current block;
deriving motion information of the current block based on a merge candidate indicated by a candidate flag of the current block in the merge candidate list;
deriving a Motion Vector Difference (MVD) of the current block based on a shift value used for the motion information, and based on MVD information for the current block;
deriving modified motion information of the current block based on the motion information and the MVD; and
performing prediction on the current block based on the modified motion information,
wherein the prediction information includes the candidate flag and the MVD information,
wherein the MVD information includes a MVD distance index and a MVD direction index for the MVD,
wherein a MVD offset of the current block is derived based on (i) a MVD distance indicated by a value of the MVD distance index from a table for the MVD distance, (ii) a MVD direction indicated by a value of the MVD direction index from a table for the MVD direction, and (iii) the shift value,
wherein the MVD is derived based on the MVD offset,
wherein based on a reference picture indicated by a reference picture index of the merge candidate being a current picture including the current block, the shift value is derived as 4, and
wherein, based on the reference picture indicated by the reference picture index of the merge candidate being not the current picture, the shift value is derived as 2,
wherein, based on the shift value being derived as 4, an absolute value of the MVD offset is derived to be equal to the value obtained by left-shifting the MVD distance by 4,
wherein, based on the shift value being derived as 2, the absolute value of the MVD offset is derived to be equal to the value obtained by left-shifting the MVD distance by 2, and
wherein a flag indicating the shift value is not signaled.

2. The image decoding method of claim 1, wherein the MVD offset is derived based on an equation below, MmvdOffset[x0][y0][0]=(MmvdDistance[x0][y0]<<2)*MmvdSign[x0][y0][0]

MmvdOffset[x0][y0][1]=(MmvdDistance[x0][y0]<<2)*MmvdSign[x0][y0][1]

where MmvdOffset[x0][y0][0] represents an x component of the MVD offset, MmvdOffset[x0][y0][1] represents a y component of the MVD offset, MmvdDistance[x0][y0] represents the MVD distance, MmvdDistancePrecisionShift represents the shift value, MmvdSign[x0][y0][0] represents an x component of the MVD direction, and MmvdSign[x0][y0][1] represents a y component of the MVD direction.

3. The image decoding method of claim 1, wherein the table for the MVD distance comprises

| mmvd_distance_idx[ x0 ][ y0 ] | MmvdDistance[ x0 ][ y0 ] |
| --- | --- |
| 0 | 1 |
| 1 | 2 |
| 2 | 4 |
| 3 | 8 |
| 4 | 16 |
| 5 | 32 |
| 6 | 64 |
| 7 | 128, | where mmvd_distance_idx8 x0][y0] represents the MVD distance index, and MmvdDistance[x0][y0] represents the MVD distance.

4. The image decoding method of claim 1, wherein the table for the MVD direction comprises

| mmvd_direction_idx[ x0 ][ y0 ] | MmvdSign[ x0 ][ y0 ][0] | MmvdSign[ x0 ][ y0 ][1 ] |
| --- | --- | --- |
| 0 | +1 | 0 |
| 1 | −1 | 0 |
| 2 | 0 | +1 |
| 3 | 0 | −1, | where mmvd_direction_idx[x0][y0] represents the MVD direction index, MmvdSign[x0][y0][0] represents an x component of the MVD direction, and MmvdSign[x0][y0][1] represents a y component of the MVD direction.

5. An image encoding method performed by an encoding apparatus, the image encoding method comprising:
  constructing a merge candidate list for a current block;
  deriving motion information of the current block based on a merge candidate in the merge candidate list;
  deriving an MVD of the current block based on a shift value used for the motion information;
  deriving modified motion information of the current block based on the motion information and the MVD;
  performing prediction on the current block based on the modified motion information; and
  encoding prediction information including a candidate flag and MVD information of the current block,
  wherein the candidate flag indicates the merge candidate,
  wherein the MVD information includes a MVD distance index and a MVD direction index for the MVD,
  wherein a MVD offset of the current block is derived based on (i) a MVD distance indicated by a value of the MVD distance index from a table for the MVD distance, (ii) a MVD direction indicated by a value of the MVD direction index from a table for the MVD direction, and (ii) the shift value,
  wherein the MVD is derived based on the MVD offset,
  wherein based on a reference picture indicated by a reference picture index of the merge candidate being a current picture including the current block, the shift value is derived as 4, and
  wherein, based on the reference picture indicated by the reference picture index of the merge candidate being not the current picture, the shift value is derived as 2,
  wherein, based on the shift value being derived as 4, an absolute value of the MVD offset is derived to be equal to the value obtained by left-shifting the MVD distance by 4,
  wherein, based on the shift value being derived as 2, the absolute value of the MVD offset is derived to be equal to the value obtained by left-shifting the MVD distance by 2, and
  wherein a flag indicating the shift value is not signaled.

6. The image encoding method of claim 5, wherein the MVD offset is derived based on an equation below, MmvdOffset[x0][y0][0]=(MmvdDistance[x0][y0]<<MmvdDistancePrecisionShift)*MmvdSign[x0][y0][0]

MmvdOffset[x0][y0][1]=(MmvdDistance[x0][y0]<<MmvdDistancePrecisionShift)*MmvdSign[x0][y0][1]

where MmvdOffset[x0][y0][0] represents an x component of the MVD offset, MmvdOffset[x0][y0][1] represents a y component of the MVD offset, MmvdDistance[x0][y0] represents the MVD distance, MmvdDistancePrecisionShift represents the shift value, MmvdSign[x0][y0][0] represents an x component of the MVD direction, and MmvdSign[x0][y0][1] represents a y component of the MVD direction.

7. The image encoding method of claim 5, wherein the table for the MVD distance comprises

| mmvd_distance_idx[ x0 ][ y0 ] | MmvdDistance[ x0 ][ y0 ] |
| --- | --- |
| 0 | 1 |
| 1 | 2 |
| 2 | 4 |
| 3 | 8 |
| 4 | 16 |
| 5 | 32 |
| 6 | 64 |
| 7 | 128, | where mmvd_distance_idx[x0][y0] represents the MVD distance index, and MmvdDistance[x0][y0] represents the MVD distance.

8. The image encoding method of claim 5, wherein the table for the MVD direction comprises

| mmvd_direction_idx[ x0 ][ y0 ] | MmvdSign[ x0 ][ y0 ][0] | MmvdSign[ x0 ][ y0 ][1 ] |
| --- | --- | --- |
| 0 | +1 | 0 |
| 1 | −1 | 0 |
| 2 | 0 | +1 |
| 3 | 0 | −1, | where mmvd_direction_idx[x0][y0] represents the MVD direction index, MmvdSign[x0][y0][0] represents an x component of the MVD direction, and MmvdSign[x0][y0][1] represents a y component of the MVD direction.

9. A non-transitory computer-readable digital storage medium storing a bitstream generated by a method, the method comprising:
  constructing a merge candidate list for a current block;
  deriving motion information of the current block based on a merge candidate in the merge candidate list;
  deriving an MVD of the current block based on a shift value used for the motion information;
  deriving modified motion information of the current block based on the motion information and the MVD;
  performing prediction on the current block based on the modified motion information; and
  generating the bitstream including prediction information including a candidate flag and MVD information of the current block,
  wherein the candidate flag indicates the merge candidate,
  wherein the MVD information includes a MVD distance index and a MVD direction index for the MVD,
  wherein a MVD offset of the current block is derived based on (i) a MVD distance indicated by a value of the MVD distance index from a table for the MVD distance, (ii) a MVD direction indicated by a value of the MVD direction index from a table for the MVD direction, and (iii) the shift value,
  wherein the MVD is derived based on the MVD offset,
  wherein based on a reference picture indicated by a reference picture index of the merge candidate being a current picture including the current block, the shift value is derived as 4, and
  wherein, based on the reference picture indicated by the reference picture index of the merge candidate being not the current picture, the shift value is derived as 2,
  wherein, based on the shift value being derived as 4, an absolute value of the MVD offset is derived to be equal to the value obtained by left-shifting the MVD distance by 4, wherein, based on the shift value being derived as 2, the absolute value of the MVD offset is derived to be equal to the value obtained by left-shifting the MVD distance by 2 and wherein a flag indicating the shift value is not signaled.

* * * * *